United States Patent [19]

Sugisawa

[11] 4,351,559

[45] Sep. 28, 1982

[54] PARCEL TRIM ATTACHMENT CONSTRUCTION

[76] Inventor: Masaki Sugisawa, No. 1-1-15, Kami-ochiai, Shinjuku-ku, Tokyo, Japan

[21] Appl. No.: 170,316

[22] Filed: Jul. 18, 1980

[30] Foreign Application Priority Data

Jul. 30, 1979 [JP] Japan ................................... 54-97475

[51] Int. Cl.³ .............................................. B62D 25/08
[52] U.S. Cl. ...................................... 296/195; 296/201
[58] Field of Search .................... 296/200, 201, 84 R, 296/93, 195; 52/397, 403, 718, 208

[56] References Cited

U.S. PATENT DOCUMENTS 4,073,535  2/1978  Alfter et al. .......................... 296/214
4,172,000  10/1979  Horike et al. ......................... 296/93

Primary Examiner—Robert R. Song
Attorney, Agent, or Firm—Thompson, Birch, Gauthier & Samuels

[57] ABSTRACT

An automobile parcel trim attachment construction in which a parcel panel is bonded to a rear window glass. The parcel panel and the window glass are positioned to form a space therebetween. A parcel trim has its rear end inserted into the space. A resilient member is mounted on the rear edge of the parcel trim and resiliently maintains the rear end in the space and out of contact with the window glass and the parcel panel.

3 Claims, 6 Drawing Figures

FIG. 3
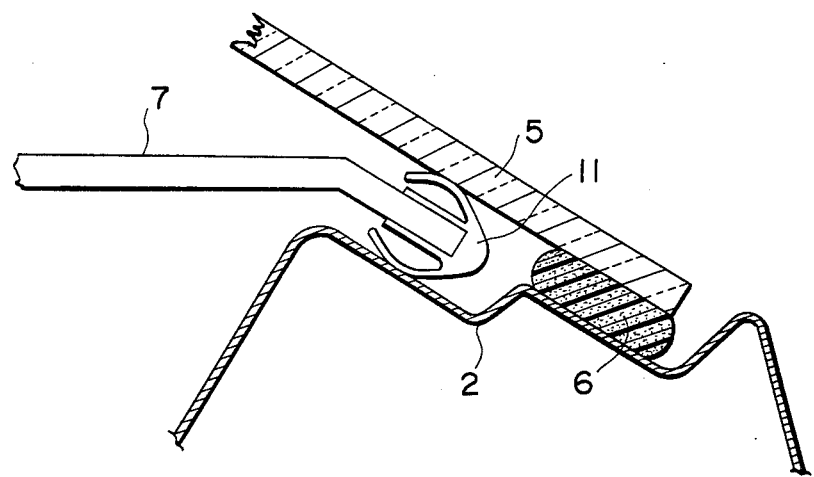
FIG. 4(a)
FIG. 4(b)
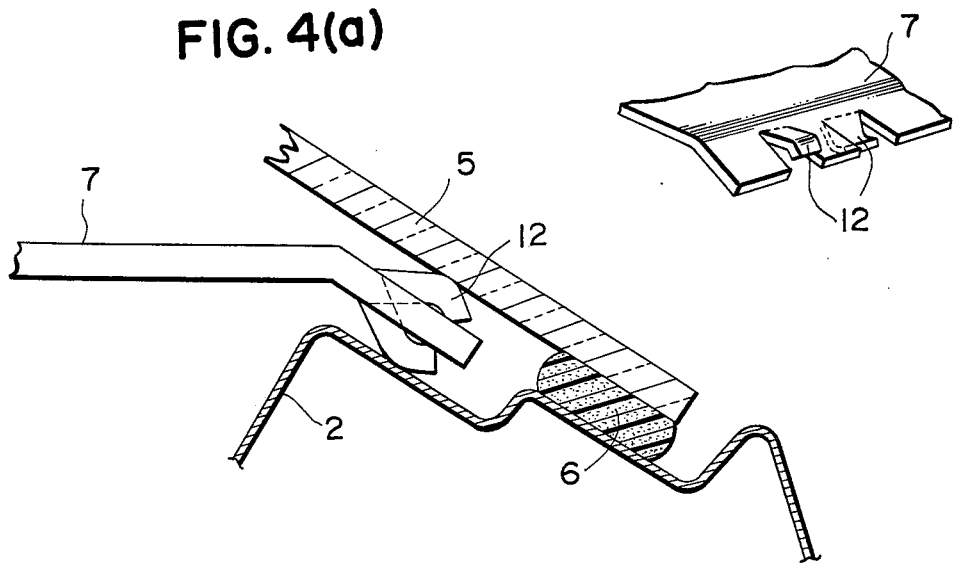

PARCEL TRIM ATTACHMENT CONSTRUCTION

BACKGROUND OF THE INVENTION

The present invention relates to a parcel trim attachment construction for an automobile including a rear window glass bonded thereto.

To facilitate understanding the present invention, a brief reference will be made to a conventional parcel trim attachment construction depicted in FIGS. 1(a) and 1(b). In FIG. 1(a), a rear portion of an automobile is shown having a rear seat 1, a parcel panel 2, a trunk lid 3 and a rear window glass 5 having an end bonded to the parcel panel with a bond 6. The parcel trim 7 is attached to the parcel panel 2 with at least one clip 8, as best shown in FIG. 1(b).

The conventional parcel trim attachment construction has various disadvantages: (1) installation is quite complicated, especially when the rear window has a sharp inclination, because there is very little work area; (2) the unsupported rear edge is unstable; and (3) hold down clips detract from the appearance and are expensive in that they must be formed in many colors.

SUMMARY OF THE INVENTION

A rear window glass is bonded to a parcel panel to form a space therebetween. A parcel trim is mounted to the parcel panel with an end inserted into the space. Means is disposed in the space for resiliently holding the end of the parcel trim in the space.

BRIEF DESCRIPTION OF THE DRAWINGS

The features and advantages of the parcel trim attachment construction according to the present invention will be more clearly appreciated from the following description taken in conjunction with the accompanying drawings in which like reference numerals designate corresponding elements, and in which:

FIG. 3 is a view similar to FIG. 2 illustrating a second embodiment of a parcel trim attachment construction according to the present invention;

FIG. 4(a) is a view similar to FIG. 3 illustrating a third embodiment of a parcel trim attachment construction according to the present invention; and FIG. 4(b) is a fragmentary perspective view of the parcel trim used in FIG. 4(a).

DETAILED DESCRIPTION OF THE INVENTION

Figure 1A:
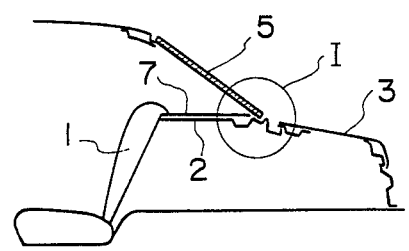
FIG. 1(a) is a schematic side elevational sectional view of a rear portion of an automobile incorporating a conventional parcel trim attachment construction.
Figure 1B:
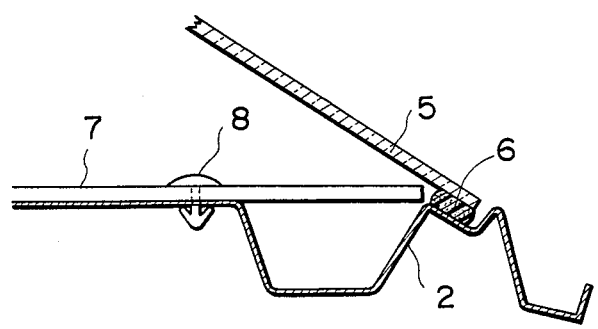
FIG. 1(b) is an enlarged view of the portion enclosed by the circle I in FIG. 1(a)
Figure 2:
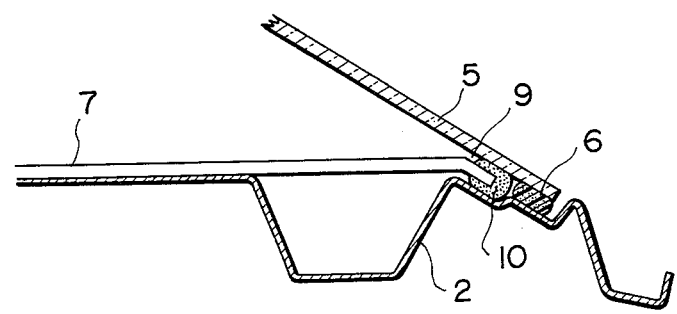
FIG. 2 is a view similar to FIG. 1(b) illustrating a preferred embodiment of a parcel trim attachment construction according to the present invention.

Referring to FIG. 2, a preferred embodiment of a parcel trim attachment construction according to the present invention is shown wherein a rear window glass 5 and a parcel panel 2 cooperate to form therebetween a space 9. A resilient member 10, e.g. of sponge or urethane foam, is mounted on the trailing edge of the rear end of a parcel trim 7. The rear end and the resilient member 10 are forcibly inserted into space 9. By this arrangement, and without the need for fasteners, e.g. clips 8, parcel trim 7 is attached to the parcel panel 2. The rear end of the parcel trim 7 is bent to be parallel to the window glass 5.

Referring to FIG. 3, a second embodiment of a parcel trim attachment construction is shown. In this embodiment, a modified resilient member 11 comprises a spring clip made of a steel or synthetic resin.

Referring to FIGS. 4(a) and 4(b), a third embodiment of the present invention is shown. In this embodiment, a modified resilient member 12 comprises a plurality of fingers made by bending portions defined by slits formed in the rear end of the parcel trim 7.

Those skilled in the art will readily appreciate that the construction of the present invention results in numerous advantages over the prior art devices: (1) the rear edge of the trim is supported; (2) installation of the trim is greatly simplified in that it is simply pushed into the space defined by the rear window glass and the parcel panel and hold down clips are unnecessary; (3) the trim rear edge is held stably in place; and (4) the appearance is improved by the elimination of the hold down clips and by the trim rear edge's being extended to seal against the rear window glass.

What is claimed is:

1. An automobile parcel trim attachment construction comprising:
   (a) a parcel panel;
   (b) a rear window glass bonded to said parcel panel;
   (c) said rear window glass and said parcel panel oriented and positioned to form a space therebetween in front of the bond location;
   (d) a parcel trim having a rear end inserted into said space; and
   (e) an elastomeric member mounted to the rear edge of said parcel trim contacting both sides of said parcel trim;
   (f) said elastomeric member contacting said rear window glass and said parcel panel, and resiliently holding said parcel trim rear end in said space, and holding said rear end spaced from and out of direct contact with said window glass and said parcel panel.

2. An automobile parcel trim attachment construction comprising:
   (a) a parcel panel;
   (b) a rear window glass bonded to said parcel panel;
   (c) said rear window glass and said parcel panel oriented and positioned to form a space therebetween in front of the bond location;
   (d) a parcel trim having a rear end inserted into said space; and
   (e) a slotted spring clip mounted to the rear edge of said parcel trim contacting both sides of said parcel trim, said spring clip having two arcuate springy arms extending about either side of said parcel trim;
   p1 (f) said spring clip contacting said rear window glass and said parcel panel, and resiliently holding said parcel trim rear end in said space, and holding said rear end spaced from and out of direct contact with said window glass and said parcel panel.

3. An automobile parcel trim attachment construction comprising:
   (a) a parcel panel;
   (b) a rear window glass bonded to said parcel panel;
   (c) said rear window glass and said parcel panel oriented and positioned to form a space therebetween in front of the bond location;
   (d) a parcel trim having a rear end inserted into said space; and (e) said parcel trim rear end having a plurality of fingers formed therein bent out of the plane of and extending above and below the plane of said parcel trim;
(f) said plurality of fingers contacting said rear window glass and said parcel panel, and resiliently holding said parcel trim rear end in said space, and holding the plane of said rear end spaced from and out of direct contact with said window glass and said parcel panel.

* * * * *